Figure 1:
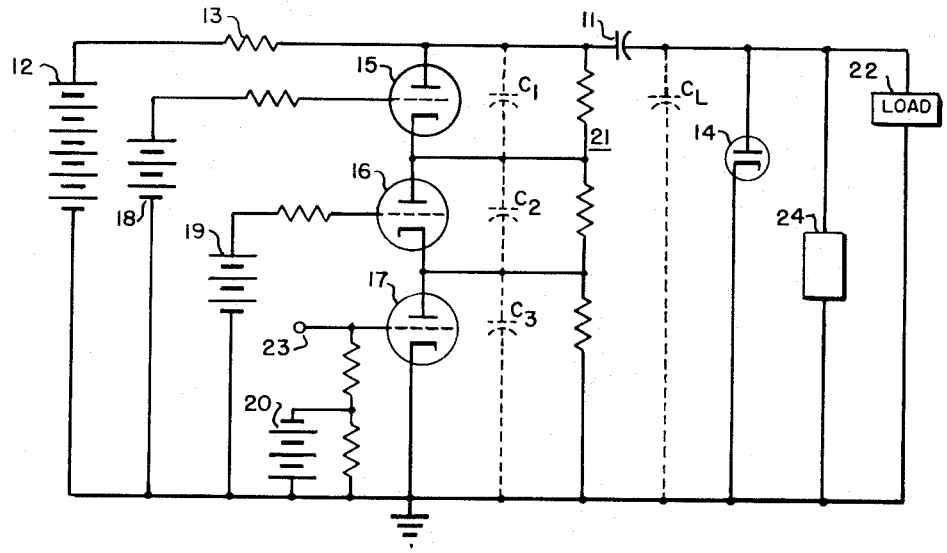

June 30, 1964  R. P. DOLAN  3,139,586
BALANCING SYSTEM FOR PULSE GENERATORS
Filed Feb. 14, 1961

INVENTOR,
RICHARD P. DOLAN.

BY Jack H. Linscott

ATTORNEY.

United States Patent Office 3,139,586
Patented June 30, 1964

3,139,586
BALANCING SYSTEM FOR PULSE GENERATORS
Richard P. Dolan, Mountain View, Calif., assignor to the United States of America as represented by the Secretary of the Army
Filed Feb. 14, 1961, Ser. No. 89,325
8 Claims. (Cl. 328—67)

This invention relates to high-voltage pulse circuits and, more particularly, to a balancing system for balancing the voltages across two or more switch tubes connected in series in a hard-tube pulser.

Some of the high power microwave tubes such as klystrons, amplitrons, magnetrons, etc., now being developed require modulating pulses of 100,000 volts and higher. However, modulator tubes or switch tubes for hard tube pulsers are not presently available with voltage ratings this high. In order to obtain modulating pulses of the voltages required, it is necessary to connect two or more switch tubes in series.

The concept of connecting vacuum tubes in series in order to handle higher voltages than the individual tubes are capable of handling is not new. However, when switch tubes in a hard-tube pulser are series-connected, a serious problem exists in keeping the voltages across the tubes balanced at all times. For example, if two 60 k.v. tubes are used to switch 120 k.v., they must not be allowed to become unbalanced at any time, since any unbalance would means that one or the other of the tubes would have a voltage greater than the rated 60 k.v. impressed across it. The overloaded tube might then develop an arc which would probably result in the destruction of both tubes.

The problem of balancing the voltages is increased by the fact that even if the two or more switch tubes are identical, as is usually the case, the circuit capacities across the tubes differ because of the differences in the filament to ground capacities of the upper tubes (usually the filament transformer capacity). This indicates that if left alone with no balancing system the capacities across some of the tubes will recharge after a pulse to greater voltages than the capacities across others of the tubes, and unbalances will occur.

In order to overcome this problem of inherent unbalance present in the above type of system, it has been the practice in the past to connect resistance dividers across the tubes to thereby cause the capacities across the tubes to charge to equal steady-state voltages. Resistance dividers are usually sufficient to maintain tube balance in line-type pulsers using thyratrons since the energy storage element is discharged completely for each pulse and a long time is required between pulses to recharge the energy storage element. However, in the case of a hard-tube pulser where discharge of the energy storage element is usually not complete and where the interpulse interval is very short, the use of a resistance divider across the tubes provides little or no solution to the problem of unbalance. This is due to the fact that the resistance in the divider must necessarily be quite large in order to minimize power loss. In addition, a discharge path for the shunt capacity across the load is sometimes provided in order to cause the load voltage to fall more rapidly after a pulse. Immediately after a pulse, the shunt capacity can discharge rapidly, but the capacities across the tubes will assume their normal voltages as if the resistance divider were not present. Eventually, of course, the capacities across the tubes in such a system will charge to equal steady-state voltages; but since this charging must be done through a high resistance, it takes a considerable length of time; and balance may be restored too late to prevent arcing.

Prior to this invention, another method of achieving balance in pulse systems using series-connected tubes was to use capacity compensation.

The main objection with capacity compensation is that it brings about poor rise time due to the addition of output capacity to a tube whose plate current is limited. In a two-tube circuit capacity compensation does not hurt the rise time appreciably. However, with more than two tubes the problem is considerably greater.

However, even if poor rise time is not objectionable in a particular application, it is difficult to predict wiring capacities, etc.; and a compensating capacitor would have to be variable or chosen individually for each different application. This gives rise to the possibility of over-compensation or under-compensation with accompanying disastrous results. It is not desirable to have adjustable capacity in the circuit when a misadjustment could cause destruction of the tubes. A safety hazard is also present and must be considered.

From the foregoing, it is obvious that a simple and effective means of ensuring that the voltages impressed across the tubes of a hard-tube pulser are balanced at all times is necessary, and that the systems of the prior art have a number of serious shortcomings.

In accordance with this invention a balancing system for a high-voltage, hard-tube pulser using a plurality of vacuum switch tubes connected in series is provided in which the energy storage capacitor is split or tapped into a plurality of sections equal in number to the number of switch tubes, and each split point or tap of the storage capacitor is connected to a different one of the junctions between adjacent tubes by means of a unilateral conducting device or diode. Between pulses each tube will have a voltage impressed across it which is equal at any instant to the voltage impressed across any other tube because of the balancing brought about through the above-mentioned diode balancing or compensating circuit.

An object of this invention is to provide a diode balancing circuit for pulse circuits using a plurality of series-connected switch tubes.

Another object of this invention is to provide a balancing system for pulse circuits using a plurality of series-connected switch tubes which will accurately balance the voltages impressed across the tubes without the necessity of initial adjustment of the system.

Still another object of the invention is to provide a diode compensating system for balancing the voltages impressed across the switch tubes in which the voltages across each of the tubes are equal to one another at all times following a pulse.

Figure 2:
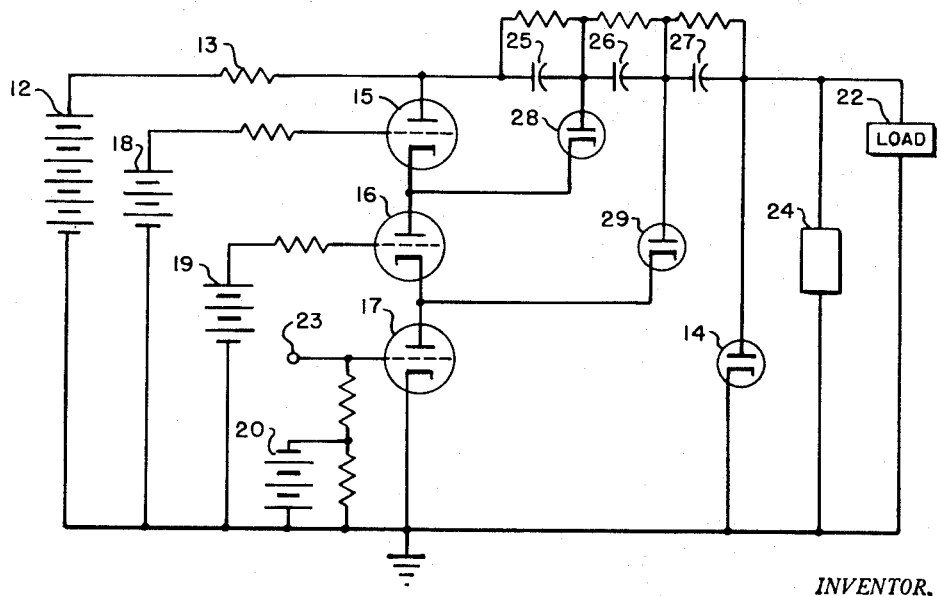

Other objects and features of this invention will become apparent to those skilled in the art upon consideration of the following detailed description taken in conjunction with the drawing in which:

FIG. 1 is a circuit diagram of a pulse system typical of the art prior to this invention, and FIG. 2 is a circuit diagram of a preferred embodiment of this invention.

Referring now to FIG. 1 in detail, a conventional high-voltage, hard-tube pulser is shown having three switch tubes connected in series with a resistance divider added across the tubes for providing balance. An energy storage condenser or capacitor 11 is charged to the desired value by a suitable source of D.C. potential 12, shown for convenience as a battery, the negative terminal of which is grounded, through an isolation resistor 13 and a charging diode 14, all connected in series. Three vacuum switch tubes 15, 16, and 17 are connected between ground and the junction of capacitor 11 and resistor 13. Tubes 15 and 16 are provided with positive grid bias by means of batteries 18 and 19, respectively, while the bottom or lower tube 17 is normally biased to cut-off battery 20 which applies a negative bias to its grid. A resistance divider 21 is connected across tubes 15, 16, 17 and a suitable load 22 is connected between ground and the junction between storage condenser 11 and diode 14.

In order to supply a high-voltage pulse to load 22, positive trigger pulses are applied to the grid of tube 17 at terminal 23. These trigger pulses are of sufficient magnitude to overcome the negative bias applied to the grid of tube 17 and render it conductive. When tube 17 is triggered into conduction, the cathode potential of tube 16 is suddenly lowered toward ground and tube 16 conducts since the positive bias potential on its grid due to battery 19 remains the same. In a similar manner, when tube 16 conducts, tube 15 is also rendered conducting. With all three switch-tubes 15, 16 and 17 conducting, storage condenser 11 discharges through the tubes and supplies a high-voltage pulse to load 22. Isolation resistor 13 is made large to prevent excessive current from being drawn from the power supply 12 during the pulse. When tube 17 is again cut off at the end of the trigger pulse, condenser 11 is recharged from source 12 through charging diode 14.

The system of FIG. 1 thus far described is a conventional hard-tube pulser, using three switch tubes connected in series in order to provide high-voltage pulses to a load. Also shown in FIG. 1 are several tube and circuit capacities which tend to cause unbalance to occur in the circuit. The output capacity of tube 15 is represented by $C_1$, $C_2$ represents the output capacity of tube 16 plus the capacity of the filament transformer of tube 15, and $C_3$ represents the output capacity of tube 17 plus the capacity of the filament transformer of tube 16 to ground. The shunt capacity across the load is represented by $C_L$. Usually a discharge path for $C_L$, shown as resistor 24 in the drawing, is provided across the load in order to cause the load voltage to fall more rapidly following a pulse.

When the switch tubes 15, 16, 17 are triggered on, $C_1$ discharges through tube 15, $C_2$ discharges through tube 16, $C_3$ discharges through tube 17, and $C_L$ charges through all three tubes. After the pulse, when switch tubes 15, 16, 17 are cut off, $C_L$ discharges through resistor 24 and load 22, and $C_1$, $C_2$ and $C_3$ recharge in series.

If switch tubes 15, 16, 17 are identical, as is usually the case, $C_1$, $C_2$ and $C_3$ are unequal for the reasons discussed previously. This indicates that in the absence of a balancing system, $C_1$, $C_2$ and $C_3$ will recharge after a pulse to different voltages and unbalance will occur. The resistance divider 21 will force $C_1$, $C_2$ and $C_3$ to charge equal steady-state voltages, but unbalance will still be present for some time after a pulse since the resistors in resistance divider 21 must be quite large in order to minimize power loss. Immediately following a pulse, $C_L$ will discharge rapidly through either load 22 or alternatively through a discharge path indicated at 24, and $C_1$, $C_2$ and $C_3$ will assume an instantaneous voltage as if resistance divider 21 were not present. Eventually, $C_1$, $C_2$ and $C_3$ each will charge to a steady-state voltage which is one-third of the total voltage; but since this charging must be done through the high impedance resistors of resistance divider 21, it takes a considerable length of time; and balance may be restored too late to prevent arcing.

A diode balancing or compensating system for balancing the voltages across the tubes at all times following a pulse is provided by this invention and is shown in FIG. 2. The components in FIG. 2 which are the same as those shown in FIG. 1 have been given the same reference numerals for the sake of clarity. The conventional energy storage condenser 11 of FIG. 1 is replaced by a split or tapped storage condenser having three sections 25, 26, 27. The number of sections is chosen to be equal in number to the number of series-connected switch tubes, and the capacitance of each part is $n$ times the original capacity, where $n$ is the number of sections. A first low-resistance compensating diode 28 is connected between the junction of capacitor sections 25 and 26 and the junction of tubes 15 and 16 and is poled to conduct current from the capacitor junction to the tube junction. A second low-resistance compensating diode 29 is connected between the junction of capacitor sections 26 and 27 and the junction of tubes 16 and 17 and has a polarity the same as that of diode 28. As is clearly seen in FIG. 2, the number of compensating diodes required is one less than the number of switch tubes and condenser sections used. A resistance divider, as shown, may be used to balance the voltages on storage condenser sections 25, 26, 27.

The basic operation of the circuit of FIG. 2 is the same as that described for FIG. 1 above with the exception, of course, of the different operation of the improved balancing system shown; and a further detailed analysis of the basic circuit operation will not be covered here. The operation of the diode compensating or balancing system is described in detail in the following paragraphs.

During a pulse, i.e. when switch tubes 15, 16, 17 are conducting, compensating diodes 28 and 29 are unnecessary, since the switch tube voltages are low and unbalance is not dangerous. Diodes 28 and 29 are rendered inoperative at such times by an inverse voltage which appears across them due to the fact that the cathodes of the diodes remain at positive potentials with respect to ground at all times while the plate potentials of the diodes which are tied to the split-points of the storage condenser can go negative with respect to ground during a pulse.

Following a pulse, compensating diodes 28 and 29 permit the circuit capacities across each of the switch tubes to charge at the same rate at which the shunt capacity $C_L$ across the load discharges. This is possible since there is no high-impedance charging path for these capacities as was the case in the circuit of FIG. 1, but rather a direct low impedance path through diodes 28 and 29 connected between the cathodes of tubes 15 and 16 and appropriate sections of the storage condenser. At all times following a pulse, the voltages impressed across switch tubes 15, 16, and 17 will be equal whereas in the system of FIG. 1 only the steady-state voltages are equal.

The diode balancing system of this invention causes the cathode pulses on the upper tubes to have the same waveform or shape as the voltage pulses on the plates which in turn, have approximately the same shape as the load pulse. The diode balancing system effectively connects the cathodes of the upper tubes to the load in the same manner as the plates to accomplish this and the desired balancing. It should further be noted that no adjustments of any of the components of the system are necessary in order to achieve accurate balance at all times.

While FIGS. 1 and 2 each show the application of a trigger pulse to the lower switch tube only, it will be obvious that trigger pulses could also have been applied to all of the switch tubes with minor changes in circuitry.

It should also be noted that while the specific embodiment of the invention shown in FIG. 2 shows three tubes, a three-sectional storage condenser and two compensating diodes, these numbers are not limiting, and that the principles of the invention apply to systems employing any number of series-connected switch tubes. The specific embodiment of the invention described is merely illustrative of the principles of the invention, and various changes and modifications may be made by those skilled in the art without departing from the spirit and scope of the invention as set forth in the appended claims.

What is claimed is:

1. In a balancing system for a pulser having a plurality of electronic switch devices connected in series, a tapped storage condenser, and a plurality of unilateral conducting devices each connected between a tap of said condenser and a junction between said electronic switch devices.

2. In a pulser using a plurality of switch tubes connected in series, a system for keeping the voltages of said switch tubes balanced including a split storage condenser and a plurality of unilateral conducting devices, the anodes of each of said unilateral conducting devices being connected to different split points of said storage condenser and the cathodes of each of said unilateral conducting devices being connected to the junctions between different pairs of said switch tubes.

3. A pulser according to claim 2 whereby the number of said unilateral conducting devices is one less than the number of said switch tubes.

4. An improvement in high-voltage pulsers using a plurality of electronic switch devices and having a storage condenser, said improvement comprising a plurality of series-connected condensers which act as said storage condenser, the number of said series-connected condensers being equal to the number of said electronic switch devices, and a plurality of unilateral conducting devices connected between the junctions of said switch devices and the junctions of said series-connected condensers.

5. An improvement in high-voltage pulsers using a plurality of electronic switch devices and having a storage condenser, said improvement comprising: a plurality of series-connected condensers which form said storage condenser, the number of said series-connected condensers and the number of said switch devices being the same, and a plurality of unilateral conducting devices, the anodes of said unilateral conducting devices each being connected to a different junction of said series-connected condensers and the cathodes of said unilateral conducting devices each being connected to a different junction of said switch devices.

6. Apparatus according to claim 5 where said switch devices are vacuum tubes.

7. Apparatus according to claim 6 where said unilateral conducting devices are diodes.

8. A balancing system for series-connected switch tubes in a high-voltage, hard-tube pulser including a power source, a split condenser, and a charging diode all connected in series, a plurality of series-connected switch tubes connected between the junction of said source and said condenser and the junction of said source and said charging diode, the number of said switch tubes and the number of sections of said split condenser being equal, a plurality of compensating diodes one less in number than the number of said switch tubes connected between said switch tubes and said condenser, whereby a different one of said compensating diodes is connected between each junction of two of said switch tubes and an appropriate one of said sections of said split condenser, and a suitable load connected in parallel with said charging diode.

References Cited in the file of this patent

UNITED STATES PATENTS

| | | |
|---|---|---|
| 2,790,935 | Lautenberger et al. | Apr. 30, 1957 |
| 2,836,718 | Meier et al. | May 27, 1958 |
| 2,921,168 | Forwald | Jan. 12, 1960 |

FOREIGN PATENTS

| | | |
|---|---|---|
| 855,737 | Germany | Nov. 17, 1952 |
| 1,086,701 | France | Aug. 11, 1954 |